(12) United States Patent
Scarlata et al.

(10) Patent No.: US 11,489,678 B2
(45) Date of Patent: Nov. 1, 2022

(54) PLATFORM ATTESTATION AND REGISTRATION FOR SERVERS

(71) Applicant: Intel Corporation, Santa Clara, CA (US)

(72) Inventors: Vincent R. Scarlata, Beaverton, OR (US); Francis X. McKeen, Portland, OR (US); Carlos V. Rozas, Portland, OR (US); Simon P. Johnson, Beaverton, OR (US); Bo Zhang, Raleigh, NC (US); James D. Beaney, Jr., Raleigh, NC (US); Piotr Zmijewski, Kartuzy (PL); Wesley Hamilton Smith, Raleigh, NC (US); Eduardo Cabre, Chandler, AZ (US); Uday R. Savagaonkar, Redmond, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/856,968

(22) Filed: Apr. 23, 2020

(65) Prior Publication Data

US 2021/0006416 A1    Jan. 7, 2021

Related U.S. Application Data

(63) Continuation of application No. 15/201,400, filed on Jul. 2, 2016, now Pat. No. 10,708,067.
(Continued)

(51) Int. Cl.
*H04L 9/32* (2006.01)
*H04L 9/08* (2006.01)
(Continued)

(52) U.S. Cl.
CPC .............. *H04L 9/3263* (2013.01); *G09C 1/00* (2013.01); *H04L 9/0816* (2013.01);
(Continued)

(58) Field of Classification Search
CPC . H04L 9/3263; H04L 9/0822; H04L 63/0823; H04L 9/3268; H04L 63/12;
(Continued)

(56) References Cited

U.S. PATENT DOCUMENTS

| 8,972,746 B2 | 3/2015 | Johnson et al. |
| 9,026,805 B2 | 5/2015 | Acar et al. |

(Continued)

FOREIGN PATENT DOCUMENTS

| KR | 20080008361 | 1/2008 |
| WO | 2017218180 | 12/2017 |

OTHER PUBLICATIONS

Anati et al., "Innovative Technology for CPU Based Attestation and Sealing", Intel Corporation, 7 pages.
(Continued)

*Primary Examiner* — Abiy Getachew
(74) *Attorney, Agent, or Firm* — Hanley, Flight & Zimmerman, LLC

(57) ABSTRACT

Embodiments include systems, methods, computer readable media, and devices configured to, for a first processor of a platform, generate a platform root key; create a data structure to encapsulate the platform root key, the data structure comprising a platform provisioning key and an identification of a registration service; and transmit, on a secure connection, the data structure to the registration service to register the platform root key for the first processor of the platform. Embodiments include systems, methods, computer readable media, and devices configured to store a device certificate received from a key generation facility; receive a manifest
(Continued)

from a platform, the manifest comprising an identification of a processor associated with the platform; and validate the processor using a stored device certificate.

20 Claims, 13 Drawing Sheets

Related U.S. Application Data

(60) Provisional application No. 62/351,956, filed on Jun. 18, 2016.

(51) Int. Cl.
    *G09C 1/00*     (2006.01)
    *H04L 9/40*     (2022.01)
    *H04L 9/14*     (2006.01)

(52) U.S. Cl.
    CPC .............. *H04L 9/0822* (2013.01); *H04L 9/14* (2013.01); *H04L 9/3268* (2013.01); *H04L 63/06* (2013.01); *H04L 63/0823* (2013.01); *H04L 63/12* (2013.01)

(58) Field of Classification Search
    CPC ......... H04L 9/0816; H04L 9/14; H04L 63/06; G09C 1/00
    See application file for complete search history.

(56) References Cited

U.S. PATENT DOCUMENTS

| | | | |
|---|---|---|---|
| 9,100,192 B2 | 8/2015 | Manohar et al. | |
| 9,189,411 B2 | 11/2015 | Mckeen et al. | |
| 10,708,067 B2 | 7/2020 | Scarlata et al. | |
| 10,742,421 B1* | 8/2020 | Wentz | H04L 9/3278 |
| 2006/0136717 A1* | 6/2006 | Buer | H04L 9/3234 |
| | | | 713/155 |
| 2007/0042754 A1 | 2/2007 | Bajikar et al. | |
| 2007/0171921 A1* | 7/2007 | Wookey | G06F 9/5027 |
| | | | 370/401 |
| 2009/0327741 A1 | 12/2009 | Zimmer et al. | |
| 2014/0006776 A1 | 1/2014 | Scott-Nash et al. | |
| 2015/0178226 A1 | 6/2015 | Scarlata et al. | |
| 2017/0244565 A1* | 8/2017 | Bronk | H04L 63/126 |

OTHER PUBLICATIONS

Hoekstra et al., "Using Innovative Instructions to Create Trustworthy Software Solutions", HASP '13: Proceedings of the 2nd International Workshop on Hardware and Architectural Support for Security and Privacy, Jun. 2013, Article No. 11, 9 pages.

International Search Report and Written Opinion issued in PCT Application No. PCT/US2017/035080 dated Aug. 29, 2017, 14 pages.

United States Patent and Trademark Office, "Non-Final Office Action," issued in connection with U.S. Appl. No. 15/201,400, dated Oct. 1, 2019, 18 pages.

United States Patent and Trademark Office, "Notice of Allowance and Fee(s) Due," issued in connection with U.S. Appl. No. 15/201,400, dated Mar. 11, 2020, 8 pages.

International Preliminary Report on Patentability issued in PCT Application No. PCT/US2017/035080 dated Dec. 18, 2018, 11 pages.

\* cited by examiner

PLATFORM ATTESTATION AND REGISTRATION FOR SERVERS

CROSS REFERENCE TO RELATED APPLICATIONS

This application claims benefit pursuant to 35 U.S.C. 119(e) of U.S. Provisional Patent Application No. 62/351,956, filed Jun. 18, 2016, which is incorporated by reference herein in its entirety.

TECHNICAL FIELD

This disclosure relates in general to the field of computer security and, more particularly, to platform attestation and registration for servers.

BACKGROUND

Software and services can be deployed over the Internet. When a service provider provisions applications over the wire or air with sensitive content, the service provides will want to know with confidence that their secrets are properly protected. In order to do so, the service providers must be able to know with certainty what software is running on the remote platform and in which environment it is executing.

BRIEF DESCRIPTION OF THE DRAWINGS

Like reference numbers and designations in the various drawings indicate like elements.

DETAILED DESCRIPTION OF EXAMPLE EMBODIMENTS

This disclosure pertains to attestation and registration for servers. This disclosure describes attestation and registration between more than one package that can make up a server environment.

Figure 1:
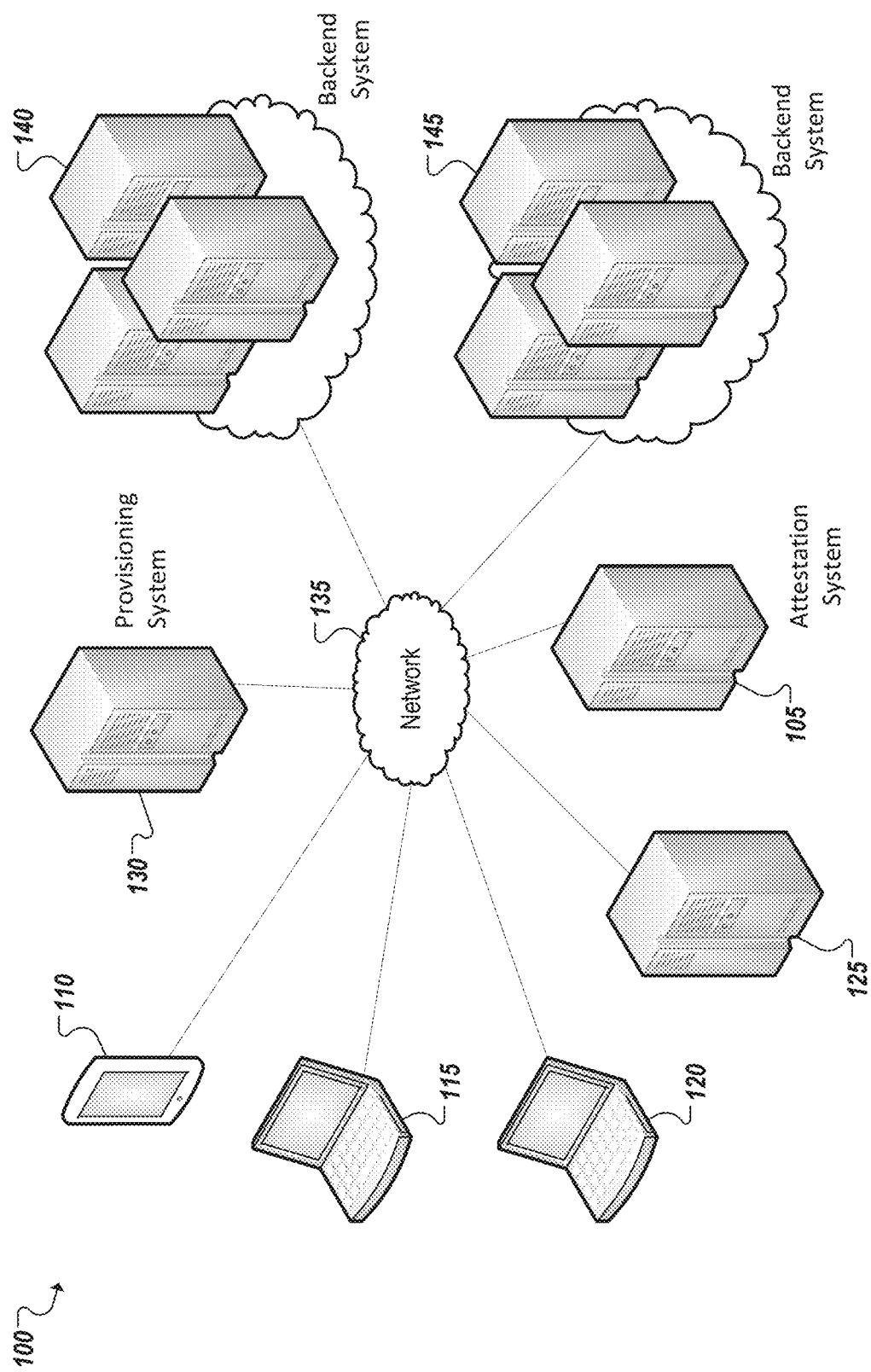
FIG. 1 is a simplified schematic diagram of an example system including an attestation system in accordance with one embodiment.

FIG. 1 is a simplified block diagram illustrating an example embodiment of a computing environment 100 including an example attestation system 105. The attestation system 105 can receive data, or "quotes," generated by secured logical components, or enclaves, running on host systems (e.g., 110, 115, 120, 125) to attest to the authenticity and security (and other characteristics) of another application or enclave of the host and confirm the attestation based on the received quote. The quote can be signed or include data that has been signed by a cryptographic key, cipher, or other element (collectively referred to herein as "keys") from which the attestation system can authenticate or confirm the trustworthiness of the quote (and thereby also the application or enclave attested to by the quote). Such keys can be referred to as attestation keys. A provisioning system 120 can be utilized to securely provision such attestation keys on the various host devices 110, 115, 120, 125.

In some cases, attestation can be carried out in connection with a client-server or frontend-backend interaction (e.g., over one or more networks 125) between an application hosted on a host system (e.g., 110, 115, 120, 125) and a backend service hosted by a remote backend system (e.g., 140, 145). Sensitive data and transaction can take place in such interactions and the application can attest to its trustworthiness and security to the backend system (and vice versa) using an attestation system (e.g., 105). In some implementations, the attestation system itself can be hosted on the backend system. In other cases, a backend system (e.g., 140) (or even another host device in a peer-to-peer attestation) can consume the attestation services of a separate attestation system (e.g., 105).

A provisioning system can maintain a database of certificates mapped to various host devices (e.g., 110, 115, 120, 125) equipped with hardware and software to implement trusted execution environments, or secure enclaves. Each of the certificates can be derived from keys that are themselves based on persistently maintained, secure secrets provisioned on the host devices (e.g., 110, 115, 120, 125) during manufacture. The secrets remain secret to the host device and may be implemented as fuses, a code in secure persistent memory, among other implementations. The key may be the secret itself or a key derived from the secret. The certificate may not identify the key and the key may not be derivable from the certificate, however, signatures produced by the key may be identified as originating from a particular one of the host devices for which a certificate is maintained based on the corresponding certificate. In this manner, a host device (e.g., 110, 115, 120, 125) can authenticate to the provisioning system 120 and be provided (by the provisioning system 120) with an attestation key that is securely associated with the host device. These attestation keys can then be used by secure enclaves on the corresponding host device (e.g., 110, 115, 120, 125) to attest to one or more applications or enclaves present on the host device.

Networks 125, in some implementations, can include local and wide area networks, wireless and wireline networks, public and private networks, and any other communication network enabling communication between the systems.

In general, "servers," "devices," "computing devices," "host devices," "user devices," "clients," "servers," "computers," "platform," "environment," "systems," etc. (e.g., 105, 110, 115, 120, 125, 120, 140, 145, etc.) can include electronic computing devices operable to receive, transmit, process, store, or manage data and information associated with the computing environment 100. As used in this document, the term "computer," "computing device," "processor," or "processing device" is intended to encompass any suitable processing device adapted to perform computing tasks consistent with the execution of computer-readable instructions. Further, any, all, or some of the computing devices may be adapted to execute any operating system, including Linux, UNIX, Windows Server, etc., as well as virtual machines adapted to virtualize execution of a particular operating system, including customized and proprietary operating systems. Computing devices may be further equipped with communication modules to facilitate communication with other computing devices over one or more networks (e.g., 125). Such networks 125 may include local and wide area networks, wireless and wireline networks, public and private networks, and any other communication network enabling communication between systems.

Host devices (e.g., 110, 115, 120, 125) can further computing devices implemented as one or more local and/or remote client or end user devices, such as application servers, personal computers, laptops, smartphones, tablet computers, personal digital assistants, media clients, web-enabled televisions, telepresence systems, gaming systems, multimedia servers, set top boxes, smart appliances, in-vehicle computing systems, and other devices adapted to receive, view, compose, send, or otherwise interact with, access, manipulate, consume, or otherwise use applications, programs, and services served or provided through servers within or outside the respective device (or environment 100). A host device can include any computing device operable to connect or communicate at least with servers, other host devices, networks, and/or other devices using a wireline or wireless connection. A host device, in some instances, can further include at least one graphical display device and user interfaces, including touchscreen displays, allowing a user to view and interact with graphical user interfaces of applications, tools, services, and other software of provided in environment 100. It will be understood that there may be any number of host devices associated with environment 100, as well as any number of host devices external to environment 100. Further, the term "host device," "client," "end user device," "endpoint device," and "user" may be used interchangeably as appropriate without departing from the scope of this disclosure. Moreover, while each end user device may be described in terms of being used by one user, this disclosure contemplates that many users may use one computer or that one user may use multiple computers, among other examples.

While FIG. 1 is described as containing or being associated with a plurality of elements, not all elements illustrated within system 100 of FIG. 1 may be utilized in each alternative implementation of the present disclosure. Additionally, one or more of the elements described herein may be located external to system 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

An attestation is a signed assertion reflecting information such as 1) what software is running within an enclave; 2) who signed the assertion and the version information; 3) the hardware information and hardware trusted computing base (TCB); and information from the enclave (e.g., trusted key). In embodiments, each platform has a certified attestation key for signing attestations on behalf of the platform.

Figure 2:
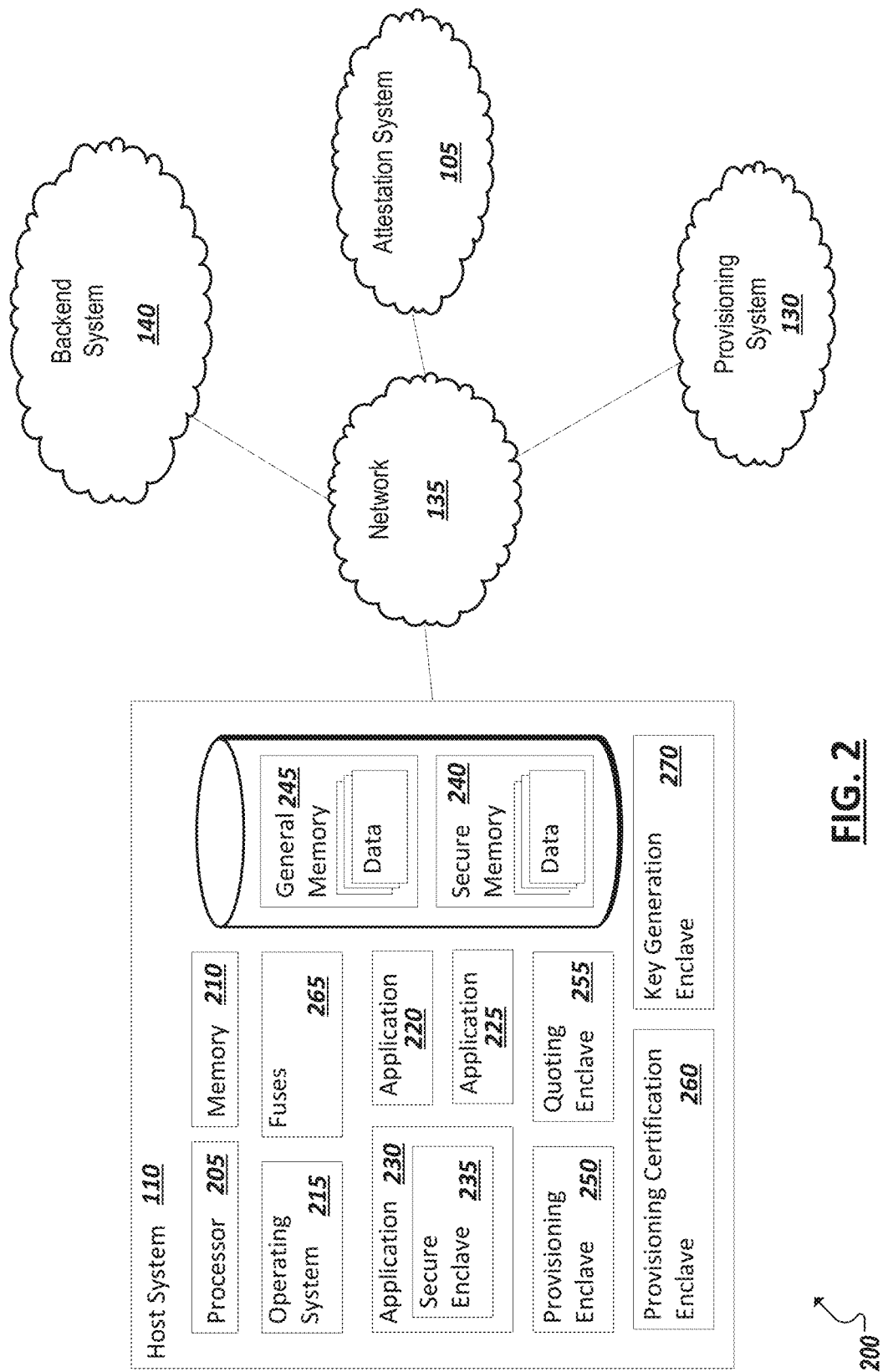
FIG. 2 is a simplified block diagram of an example system including an example platform supporting secure enclaves in accordance with one embodiment.

Turning to the example of FIG. 2, a simplified block diagram 200 is shown illustrating a system or computing environment that includes a host system 110 equipped to support one or more secure enclaves (e.g., 235, 250, 255, 260, 265). A host system 110 can include one or more processor devices 205, one or more memory elements 210, and other components implemented in hardware and/or software, including an operating system 215 and a set of applications (e.g., 220, 225, 230). One or more of the applications may be secured using a secure enclave 235, or application enclave. Secure enclaves can be implemented in secure memory 240 (as opposed to general memory 245) and utilizing secured processing functionality of at least one of the processors (e.g., 205) of the host system to implement private regions of code and data to provide certain secured or protected functionality of the application. Logic, implemented in firmware and/or software of the host system (such as code of the CPU of the host), can be provided on the host system 110 that can be utilized by applications or other code local to the host system to set aside private regions of code and data, which are subject to guarantees of heightened security, to implement one or more secure enclaves on the system. For instance, a secure enclave can be used to protect sensitive data from unauthorized access or modification by rogue software running at higher privilege levels and preserve the confidentiality and integrity of sensitive code and data without disrupting the ability of legitimate system software to schedule and manage the use of platform resources. Secure enclaves can enable applications to define secure regions of code and data that maintain confidentiality even when an attacker has physical control of the platform and can conduct direct attacks on memory. Secure enclaves can further allow consumers of the host devices (e.g., 110) to retain control of their platforms including the freedom to install and uninstall applications and services as they choose. Secure enclaves can also enable a host system platform to measure a corresponding application's trusted code and produce a signed attestation, rooted in the processor, that includes this measurement and other certification that the code has been correctly initialized in a trustable environment (and is capable of providing the security features of a secure enclave, such as outlined in the examples above). Generally, secure enclaves (and other secured enclaves described herein) can adopt or build upon principles described, for instance, in the Intel® Software Guard Extensions Programming Reference, among other example platforms.

Figure 3:
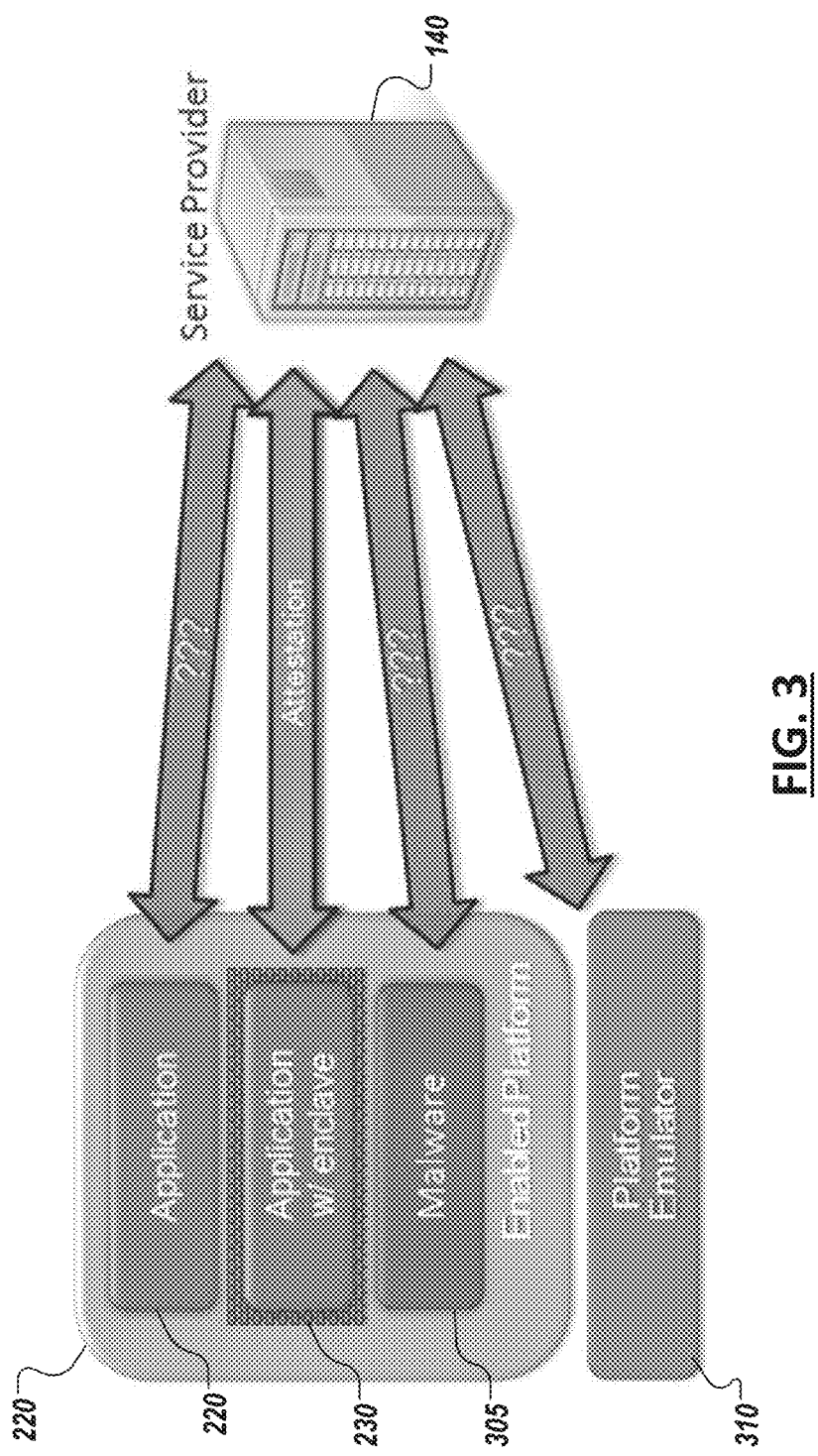
FIG. 3 is a simplified block diagram representing application attestation in accordance with one embodiment.

Turning briefly to FIG. 3, an application enclave (e.g., 235) can protect all or a portion of a given application and allow the application (and its security features) to be attested to. For instance, a service provider 140, such as a backend service or web service, may prefer or require that clients, with which it interfaces, possess certain security features or guarantees, such that the service 140 can verify that it is transacting with who it the client says it is. For instance, malware (e.g., 305) can sometimes be constructed to spoof the identity of a user or an application in an attempt to extract sensitive data from, infect, or otherwise behave maliciously in a transaction with the service 140. Signed attestation (or simply "attestation") can allow an application (e.g., 230) to verify that it is a legitimate instance of the application (i.e., and not malware). Other applications (e.g., 220) that are not equipped with a secure application enclave may be legitimate, but may not attest to the service provider 140, leaving the service provide in doubt, to some degree, of the application's authenticity and trustworthiness. Further, host system platforms (e.g., 210) can be emulated (e.g., by emulator 310) to attempt to transact falsely with the service 140. Attestation through a secure enclave can guard against such insecure, malicious, and faulty transactions.

Returning to FIG. 2, attestation can be provided on the basis of a signed piece of data, or "quote," that is signed using an attestation key securely provisioned on the platform. Additional secured enclaves can be provided (i.e., separate from the secure application enclave 235) to measure or assess the application and its enclave 235, sign the measurement (included in the quote), and assist in the provisioning of one or more of the enclaves with keys for use in signing the quote and established secured communication channels between enclaves or between an enclave and an outside service (e.g., 105, 120, 140). For instance, one or more provisioning enclaves 250 can be provided to interface with a corresponding provisioning system to obtain attestation keys for use by a quoting enclave 255 and/or application enclave. One or more quoting enclaves 255 can be provided to reliably measure or assess an application 230 and/or the corresponding application enclave 235 and sign the measurement with the attestation key obtained through the corresponding provisioning enclave 250. A provisioning certification enclave 260 may also be provided to authenticate a provisioning enclave (e.g., 250) to its corresponding provisioning system (e.g., 120). The provisioning certification enclave 260 can maintain a provisioning attestation key that is based on a persistently maintained, secure secret on the host platform 110, such as a secret set in fuses 265 of the platform during manufacturing, to support attestation of the trustworthiness of the provisioning enclave 250 to the provisioning system 120, such that the provisioning enclave 250 is authenticated prior to the provisioning system 120 entrusting the provisioning enclave 250 with an attestation key. In some implementations, the provisioning certification enclave 260 can attest to authenticity and security of any one of potentially multiple provisioning enclaves 250 provided on the platform 110. For instance, multiple different provisioning enclaves 250 can be provided, each interfacing with its own respective provisioning system, providing its own respective attestation keys to one of potentially multiple quoting enclaves (e.g., 255) provided on the platform. For instance, different application enclaves can utilize different quoting enclaves during attestation of the corresponding application, and each quoting enclave can utilize a different attestation key to support the attestation. Further, through the use of multiple provisioning enclaves and provisioning services, different key types and encryption technologies can be used in connection with the attestation of different applications and services (e.g., hosted by backend systems 140).

In some implementations, rather than obtaining an attestation key from a remote service (e.g., provisioning system 120), one or more applications and quoting enclaves can utilize keys generated by a key generation enclave 270 provided on the platform. To attest to the reliability of the key provided by the key generation enclave, the provisioning certification enclave can sign the key (e.g., the public key of a key pair generated randomly by the key generation enclave) such that quotes signed by the key can be identified as legitimately signed quotes. In some cases, key generation enclaves (e.g., 270) and provisioning enclaves (e.g., 250) can be provided on the same platform, while in other instances, key generation enclaves (e.g., 270) and provisioning enclaves (e.g., 250) can be provided as alternatives for the other (e.g., with only a key generation enclave or provisioning enclaves be provided on a given platform), among other examples and implementations.

Figure 4:
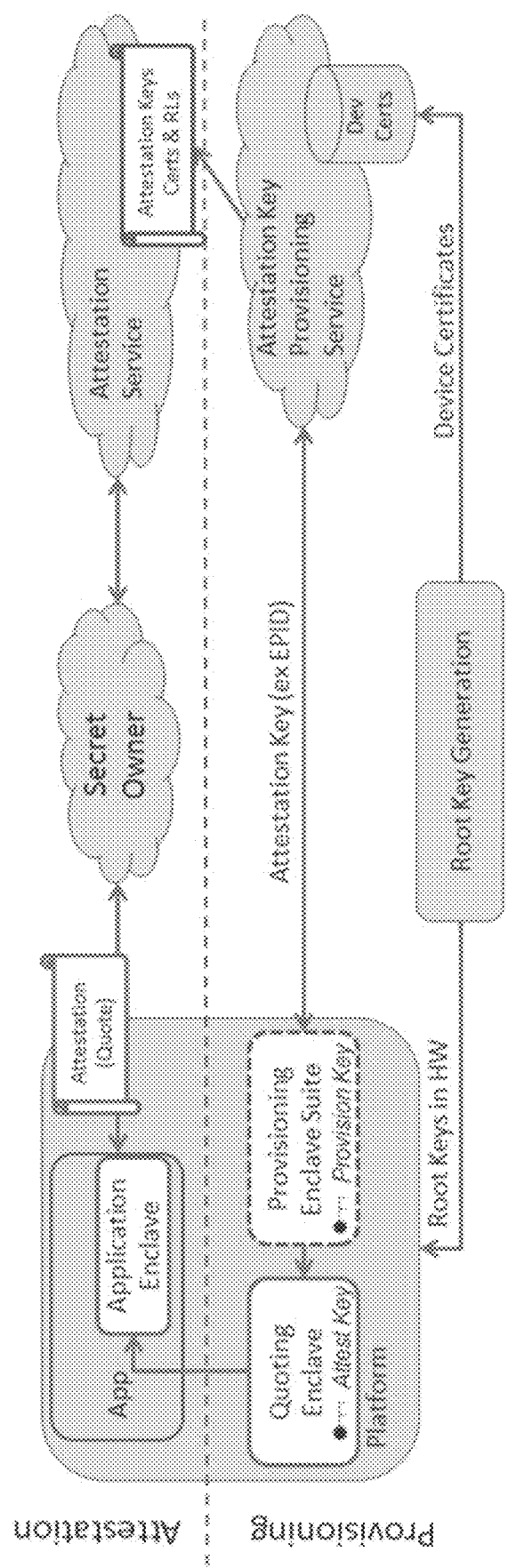
FIG. 4 is a simplified block diagram representing a first implementation of a system supporting attestation in accordance with one embodiment.

Turning to FIG. 4, in some platforms, a single quoting enclave is provided and interface directly with a provisioning enclave suite. The same quoting enclave is used here for each application enclave provided on the system. A provisioning key is hosted in the provisioning enclave suite and is used to negotiate authenticate the provisioning suite to an attestation key provisioning service. The attestation key provisioning service can maintain device certificates (also referred to as platform registration certificates) that map devices (e.g., device serial numbers) to corresponding certificates, each certificate generated based on root keys set (and kept in secret) in hardware of the device platform. In this manner, certificates can be provided, which do not disclose the hardware-based secret maintained at the device, but allow the presence of the secret to be verified by the certificate holder (e.g., based on a signature generated from the secret or a key based on the secret). Accordingly, the provisioning enclave suite can provide signed data to the attestation key provisioning service to attest to its authenticity and that it is implemented on a device platform known to possess functionality enabling the instantiation and hosting of a secure, trustworthy enclave. Based on this attestation, the attestation key provisioning service can negotiate a secure channel between the attestation key provisioning service and the provisioning enclave suite and provide an attestation key to the provisioning enclave suite in response. Indeed, the data signed by the provisioning enclave suite can include information (e.g., signed public keys, protocol identifiers, etc.) used to establish the secure channel. The provisioning enclave suite can then provision the quoting enclave with the received attestation key. The quoting enclave can measure or identify attributes of the application and/or application enclave as well as the hosting platform and can provide this information in a quote containing data, at least a portion of which is signed using the attestation key at the quoting enclave. For instance, a quote may identify such characteristics as the type and identifier of the platform processor (e.g., CPU, chipset, etc.), firmware version used by the processor(s), identification and status of any authenticated code modules (ACMs) of the processor(s), presence of trusted boot functionality, firmware of all trusted devices, software versions for any enclave providing security services, among other examples. The quoting enclave then passes the signed quote to the application enclave, which can communicate the quote to a backend service (such as a secret owner (e.g., hosting secrets usable by the application to decrypt data or access content, etc.) to attest the authenticity of the application. In this example, the backend service (e.g., "secret owner") can utilize the services of an attestation service, which can receive attestation key certificates and revocation lists generated by the attestation key provisioning service that generated the attestation key used by the quoting enclave of the platform. Through these certificates, the attestation service can verify the authenticity of the quote based on the signature included in the quote (signed by the attestation key provided by the attestation key provisioning service). Upon verifying the authenticity of the quote and further verifying, from the description of the application enclave included in the quote, the characteristics of the application enclave (e.g., that it is a reliably implemented enclave on a capable platform), the attestation service can communicate the results of the attestation to the backend service. From these results, the backend service can provide a level of service (or grant/deny service entirely) based on whether or not the application is protected by a trustworthy application enclave.

Figure 5:
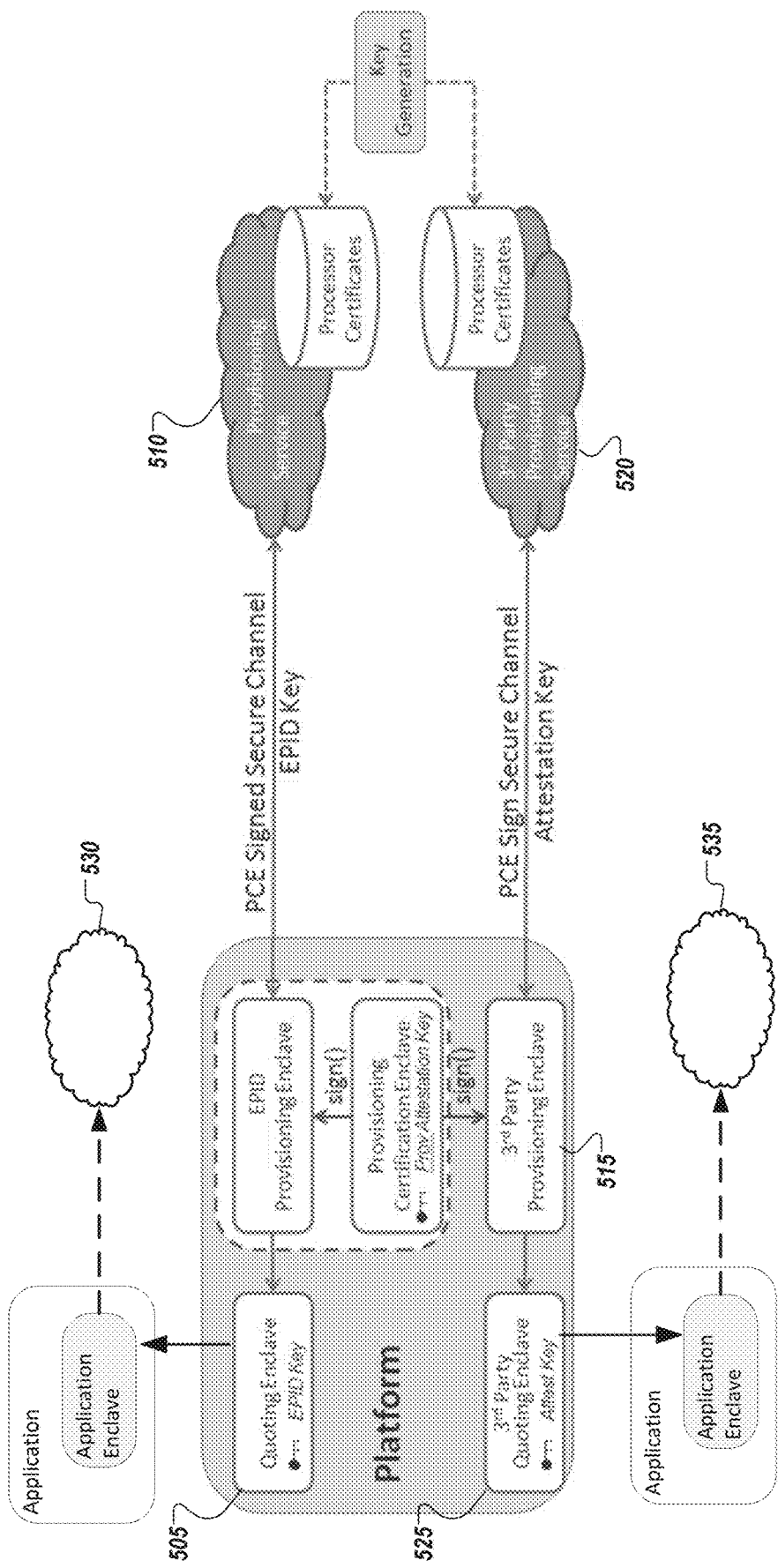
FIG. 5 is a simplified block diagram representing a second implementation of a system supporting attestation in accordance with one embodiment.

Turning to the example of FIG. 5, a simplified block diagram is shown illustrating an improved version of an attestation platform provided on a device platform. In this example, multiple potential provisioning enclaves and quoting enclaves are supported. For instance, an enhanced privacy ID (EPID)-based provisioning enclave (corresponding to or provided in connection with a manufacturer of the device platform) can be instantiated to provision a first quoting enclave that uses a first type of attestation key and a second provisioning enclave (corresponding to a third-party (i.e., other than the provider or manufacturer of the platform)) can provision a second quoting enclave that potentially uses a different, second type of attestation key (e.g., an RSA key), among other examples. Indeed, two or more different provisioning enclaves can be provided to provision attestation keys on two or more distinct quoting enclaves. In turn, each of these quoting enclaves can provide attestation support to one or more application enclaves (e.g., one quoting enclave can support two application enclaves, another quoting enclave can support another application enclave, etc.). These multiple provisioning enclaves can be supported by a single provisioning certification enclave, which manages a provisioning attestation key generated from a persistently and securely maintained secret of the device (e.g., a root key) set during manufacturing of the device.

In the example of FIG. 5, each of the various provisioning enclaves can be associated with a corresponding provisioning service, from which respective attestation keys are to be obtained. The provisioning certification enclave can effectively serve to support the attestation of the provisioning enclave to its corresponding provisioning service. For instance, an EPID provisioning enclave, in order to provision a corresponding quoting enclave (e.g., 505) with an EPID-based attestation key, can request an attestation quote from the provisioning certification enclave that is signed using the provisioning attestation key. The provisioning certification enclave can generate the signature using the provisioning attestation key and provide the signature (or signed attestation quote) to the EPID provisioning enclave. The signed quote can be shared with the corresponding provisioning service (e.g., 510) to authenticate to the provision service and establish a secure channel between the provisioning service and provisioning enclave. The attestation quote can include information (e.g., signed public keys, protocol identifiers, etc.) used to establish the secure channel. As in the example of FIG. 4, each of the (potentially multiple different) provisioning services (e.g., 510) may have a copy of the certificates, which have been issued for each of a collection of platforms configured to support secure enclaves and attestation and which are based on the root keys (or other secrets) set at each of the respective device platforms at (or following) manufacture. These certificates obscure the secret upon which the provisional attestation key is based, but may be used to decrypt information and verify signatures generated using a corresponding one of these provisional attestation keys (upon which the certificates are also based). Accordingly, a provisioning enclave can provide a quote signed with the provisional attestation key, which is verifiable at any one of the provisioning services having access to the processor certificates. A secure channel can be established based on the attestation of the provisioning enclave (e.g., using a public key exchange, or other technology) over which the provisioning service can also transmit an attestation key to the corresponding provisioning enclave. The provisioning enclave can then provision the received key onto a corresponding quoting enclave. Similarly, other provisioning enclaves (e.g., 515) can also request a signed quote from the provisioning certification enclave that the provisioning enclave can use as the basis of negotiating its own secure channel with a corresponding provisioning service (e.g., 520) and attest to its trustworthiness as a provisioning enclave. Likewise, a corresponding attestation key can be delivered to the provisioning enclave, which may be passed to its corresponding quoting enclave (e.g., 525) for use in attesting to one or more corresponding application enclaves. As in the example of FIG. 4, the application enclaves can receive quotes signed by their respective quoting enclaves (using their corresponding attestation keys) to attest to various backend systems (e.g., 530, 535) and enjoy heightened access and functionality on the basis of the application being protected by a trusted application enclave. Such attestations can provide a variety of privileges and enhanced services and features, such as authorizing a service, authorizing additional services (premised on the presence of an application enclave on the client), issuance of certificates from a certificate authority, allow sensor-type platforms to pair with a coordination point and/or allow data to be accepted from sensors (e.g., in an Internet of Things system), among potentially limitless other examples.

Figure 6:
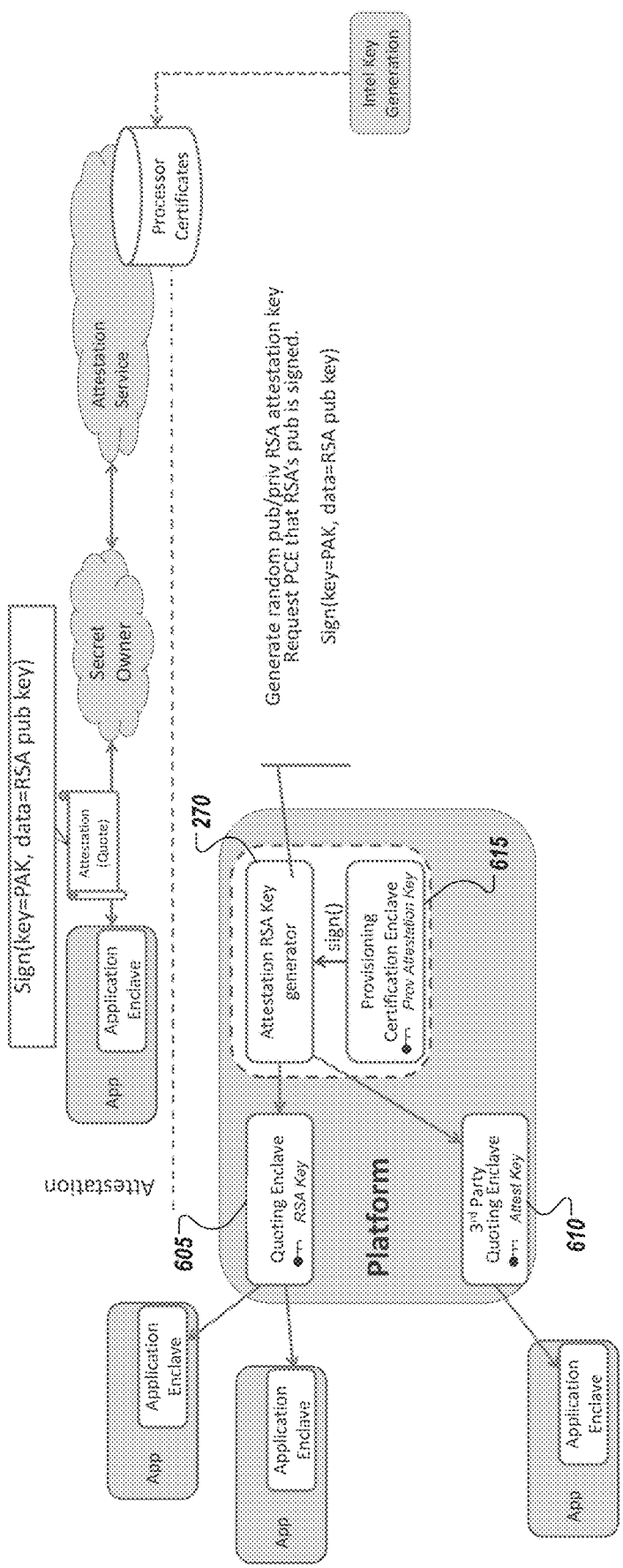
FIG. 6 is a simplified block diagram representing a third implementation of a system supporting attestation in accordance with one embodiment.

As noted above, in some implementations, a key generator enclave 270 can be provided as opposed to (or in addition to) provisioning enclaves, which ultimately rely on outside provisioning services as the source of attestation keys to be passed to corresponding quoting enclaves. For instance, in the example illustrated by the simplified block diagram shown in FIG. 6, a key generator enclave 270 can be provided, which generates random public/private attestation key pairs for use in provisioning one or more quoting enclaves (e.g., 605, 610) with attestation keys. For instance, the key generator enclave 270 can generate (at random) a first attestation key pair (e.g., an RSA or Elliptic Curve Digital Signature Algorithm (ECDSA) key pair) for a first quoting enclave 605 and separately generate another, second attestation key pair for another quoting enclave 610. The private key of the attestation key pair is passed to the quoting enclave 605 for use as the attestation key of the quoting enclave.

Upon generating an attestation key pair, the key generator enclave 270 can request that the provisioning certification enclave 615 sign the public key in the pair as a form of quote to attest to the security and authenticity of the key generator enclave 270. In one implementation, the provisioning certification enclave signs the public key of the attestation key pair with the hardware-based provisioning attestation key. The signed public key can serve as a certification issued/signed using the provisioning attestation key. Processor certificates possessed by the attestation service can verify the signature produced by the provisioning certification enclave based on the provisioning attestation key, as in other examples, in that the processor certificates may be generated at manufacture time in connection with the provisioning of the hardware-based secret upon which the provisioning attestation key is based. In one example, the signed public key can be sent (e.g., by the provisioning certification enclave or another enclave (not shown)) to an external entity for delivery directly to the attestation service. In other examples, the signed public key can be provided to the quoting enclave to be appended to quotes generated and signed by the quoting enclave, for eventual delivery to the attestation service. The attestation service may receive quotes from the application enclave (as generated by the quoting enclave 605) and identify the corresponding signed public key (e.g., in the quote itself). The attestation service can query its collection of processor certificates to verify that the public key was signed by (the provisioning attestation key of) a reputable platform to conclude that data (e.g., quotes) signed by the quoting enclave (e.g., using the private key of the attestation key pair) are likewise to be trusted. The attestation service can then further verify that the quote was signed by the private key of the attestation key pair and consume the data describing the application contained in the quote.

Figure 7:
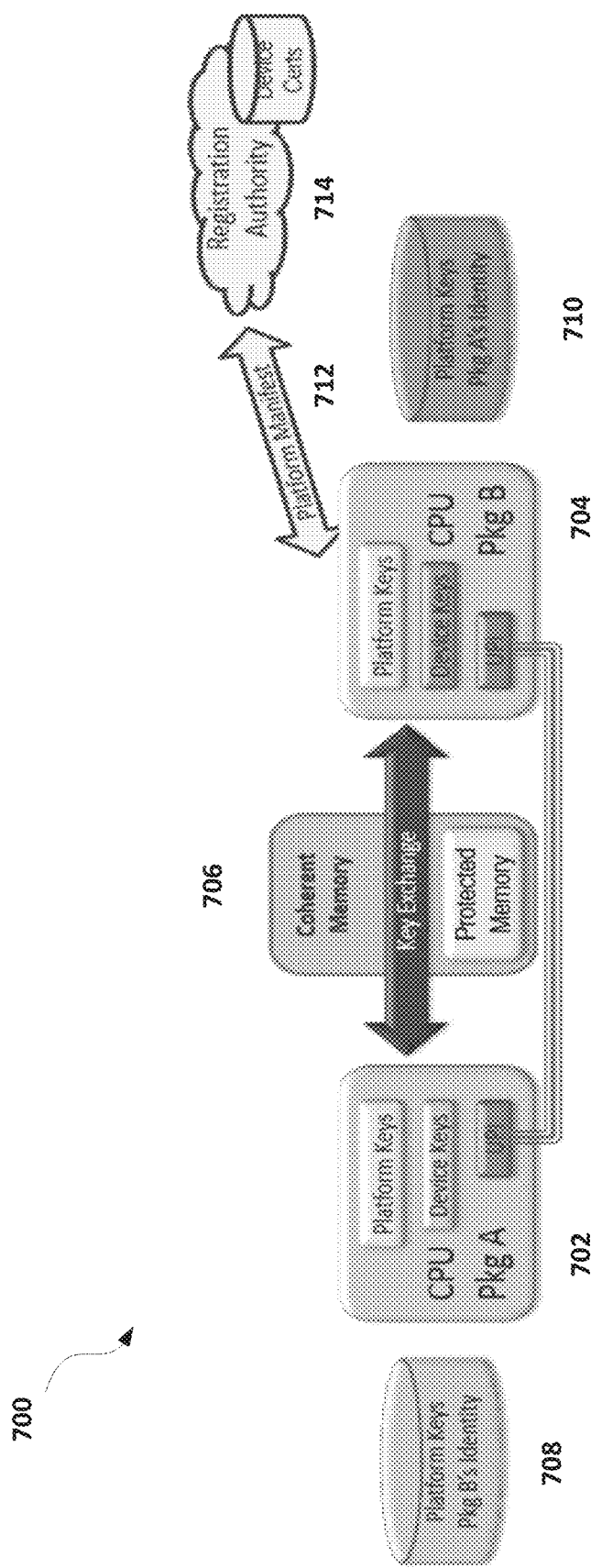
FIG. 7 is a schematic block diagram of a multi-package environment in accordance with embodiments of the present disclosure.

FIG. 7 is a schematic block diagram of a multi-package environment 700 in accordance with embodiments of the present disclosure. The software guard extensions use platform keys that are shared between packages.

Multi-package environment 700 (also referred to as platform 700) can include a server or plurality of servers or machines that include one or more packages. In the context of this disclosure, a package includes a microprocessor, central processing unit, processor core, or other processing circuit element. In FIG. 7, environment 700 is shown to include two packages, package A 702 and package B 704. Also, in the context of this disclosure, a multi-package environment can also be referred to as a platform.

FIG. 7 illustrates the formation of platform keys that are shared between packages in the multi-package platform (e.g., for secure booting of packages). Platform keys can be generated and distributed between packages. User data stored and processed in the platform 700 can be protected by platform keys generated by the platform 700. The BIOS can store the platform keys encrypted by each packages hardware key.

The packages can generate a platform key based on a random number or pseudo random number. Each package uses a device key to encrypt a copy of its platform key. Device keys are hardware specific to the package, so each platform key for the platform will include an indication of the device key used to encrypt the platform key(s).

Key can be generated by one of more random or pseudorandom values selected by one of more of the packages. If more than one package generates a random key, the random keys may be merged to result in a single key. In embodiments, each package can create part of the key, and the several key parts can be combined to form a single key representing the group of packages.

Platform 700 includes a coherent memory 706. Coherent memory can include protected memory areas. Package A can derive a private portion of a signing key from Package A's hardware key(s). This unique public/private key pair can uniquely identify Package A. Package B can also derive a private portion of a signing key from Package B's hardware key(s). Package A and Package B can select a platform key that is share between Package A and Package B. Package A, for example, can use Package A's hardware key to encrypt {platform keys, Package B public key}. When the platform 700 is restarted, Package A can decrypt the platform keys again to use them for SGX. It also has a list of the packages that it is allowed communicate with (here, Package B). If a package appears after the reboot, Package A and Package B both know something has changed. Also, to speed up the boot process, each package stores the secure communication keys that they used to propagate the platform keys. During the next restart, they can reload these keys and skip the expensive protocols used to create them.

Figure 8:
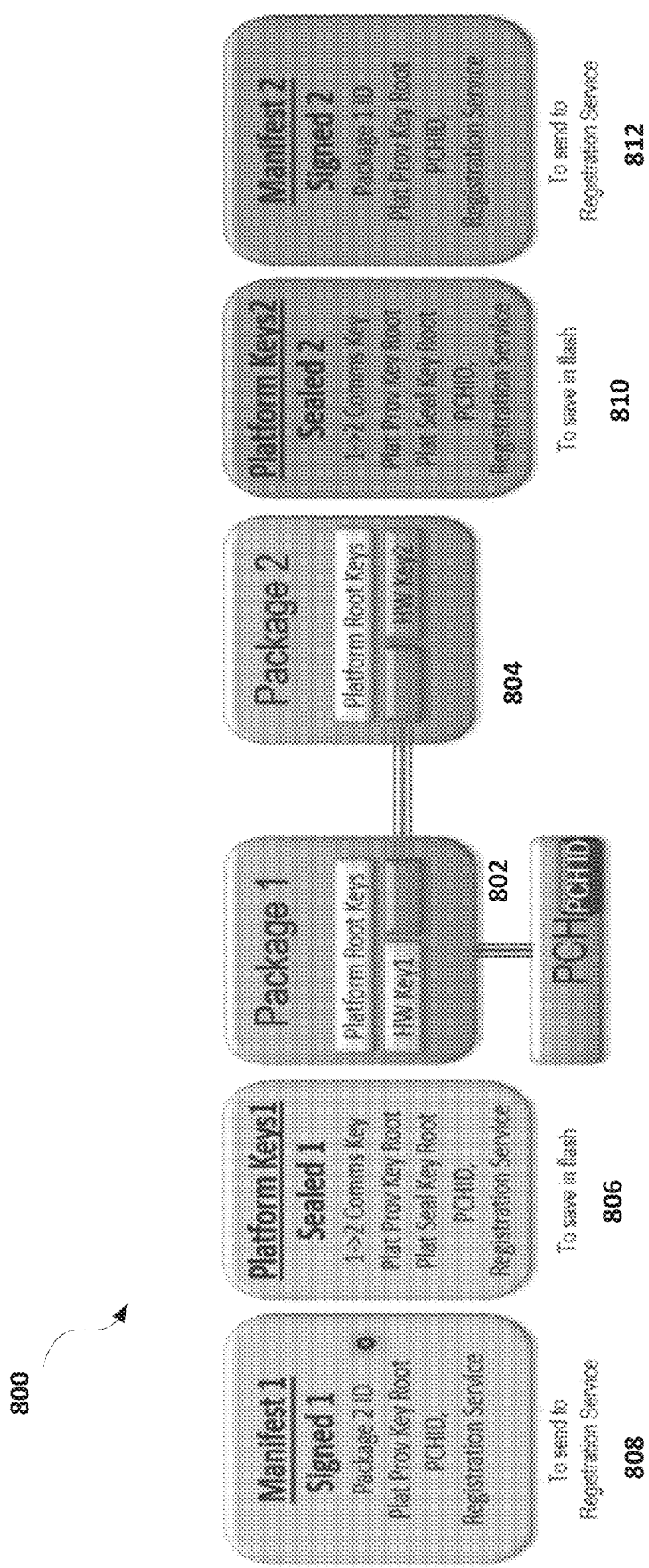
FIG. 8 is a schematic diagram of the establishment of a platform instance in accordance with embodiments of the present disclosure.

Package A identity stored in flash memory for Package B can include a platform provisioning key root and a platform seal key root, as well as a communications key for communications between package A and package B (shown in FIG. 8).

Platform keys generated for the packages in multi-package environment 700 may not be recognized by the provisioning system (described above in connection with FIGS. 1-6). Therefore, the platform keys are registered with a registration authority 714. A platform manifest 712 can be generated by each package in the platform 700. The platform manifest 712 can include platform key(s) and can include information describing the packages in the platform. In some embodiments, the manifest 712 can be signed using the platform key. The platform key can also be referred to as a platform root key.

The registration service 714 can authenticate the manifest using platform registration certificates associated with packages identified from the manifest. That is, each package can be associated with a device certificate distributed by a device manufacturer. The device certificate can be stored in a repository associated with the registration service 714.

The registration service 714 can determine the platform's provisioning attestation key, as described above. The registration service 714 can distribute the provide platform identification information to the provisioning infrastructure (also described above). In some embodiments, the registration service 714 can distribute a key that can be used to acquire an attestation key.

FIG. 8 is a schematic diagram of the establishment of a platform instance in accordance with embodiments of the present disclosure. Environment 800 includes two packages, package 1 802 and package 2 804 (which are analogous to packages A and B from FIG. 7). Each package uses a device key (e.g., a hardware key) to seal and store a copy of the platform key(s), package information, platform provisioning key root, Physical channel identifiers, and corresponding registration service. Such information can be stored associated with a platform key associated with the package (e.g., platform keys 1 806 associated with package 1 802; and platform keys 2 810 associated with package 2).

Each package can create a manifest that includes package identification information and can be signed by device keys associated with the package. For example, for package 1, 802, the manifest 1 808 can include package 2 identification information and can be signed using package 1's device key. Similarly, for package 2, 804, the manifest 1 812 can include package 1 identification information and can be signed using package 2's device key.

Figure 9:
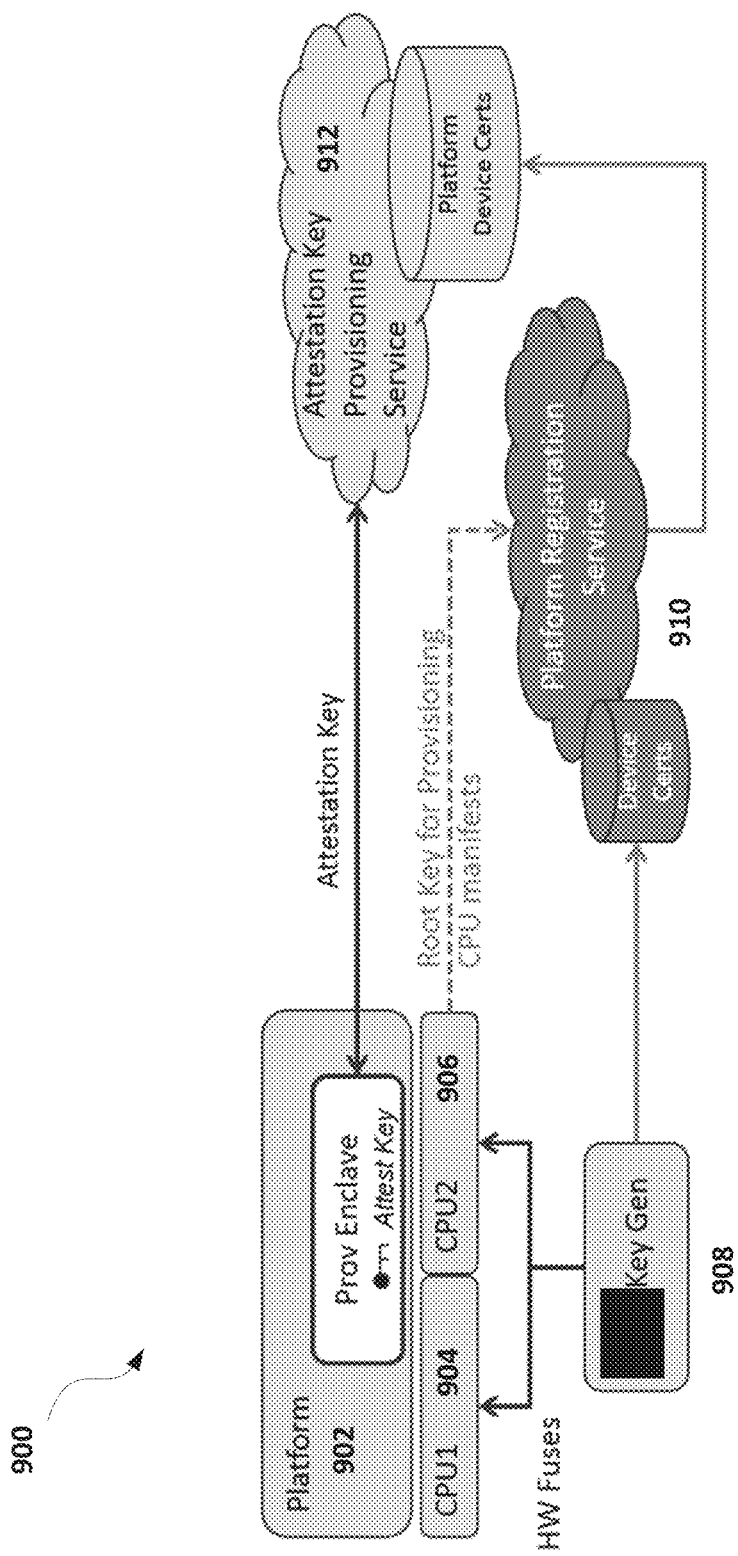
FIG. 9 is a schematic diagram of registering and provisioning a multi-package platform in accordance with embodiments of the present disclosure.

FIG. 9 is a schematic diagram of registering and provisioning a multi-package platform in accordance with embodiments of the present disclosure. Environment 900 includes a platform 902 that is shown to include CPU1 904 and CPU2 906. As mentioned before, manufacturers of the packages puts a unique device key into each processor package. Packages generate new platform keys and sends the platform keys to a registration service 910. The registration service 910 can authenticate each platform key using a device certificate for the constituent package identification. The registration service 910 can create a device certificate for the platform key.

The registration service 910 can send the device certificate to the provisioning service 912. The provisioning service 912 can generate and provision an attestation key for the platform 902, and send the attestation key to the platform 902. The attestation key can be used by secure enclaves on corresponding packages of the platform 902 to attest to one or more applications or enclaves present on the packages (e.g., the packages 904 or 906 that were identified in the manifest sent to the platform registration service 910). The provisioning service can validate the platform using the platform's device certificate, which can apply to any package that is part of the platform (i.e., included in the manifest).

The registration service 910 can maintain a database of device/package certificates received from device manufacturers. The device certificates can be used to verify that packages listed on manifests received from platforms are genuine. The database can be updated periodically as new packages/parts are manufactured. The registration service 910 can also store revocation lists that can be used to revoke package authenticity.

In some embodiments, the registration service 910 can also store platform keys necessary to derive and certify platform provisioning signing keys. The registration service 910 can issue device/package certificates that the provisioning service can use to provision attestation keys. The registration service 910 can also approve (or disapprove) platform modifications, discussed in FIG. 10.

The platform 902 BIOS may not be able to communicate directly with the registration service 910. The platform 902 can communicate with the registration service 910 via in-band connection. For example, host management stack can detect new manifests or package add requests. Software can contact the registration service 910 through a network connection. In some embodiments, the connectivity can be out of band. For example, a node manager or baseboard management controller (BMC) can detect a new manifest or package add message. The manifest can be pushed to the registration service 910 or pulled by administrators of the registration service 910.

The BMC is an additional processor on the motherboard that is connected to a maintenance network. Administrators can connect to it and request that it run diagnostics on the platform if the platform will not boot. This access is referred to as "out of band" because it can be considered as a side door to the platform.

In some embodiments, after creating a manifest, the BIOS can boot into a maintenance environment. The platform 902 can connect to the registration service while in the maintenance environment.

In any case, a connection is available during platform establishment and during process or changes.

Figure 10:
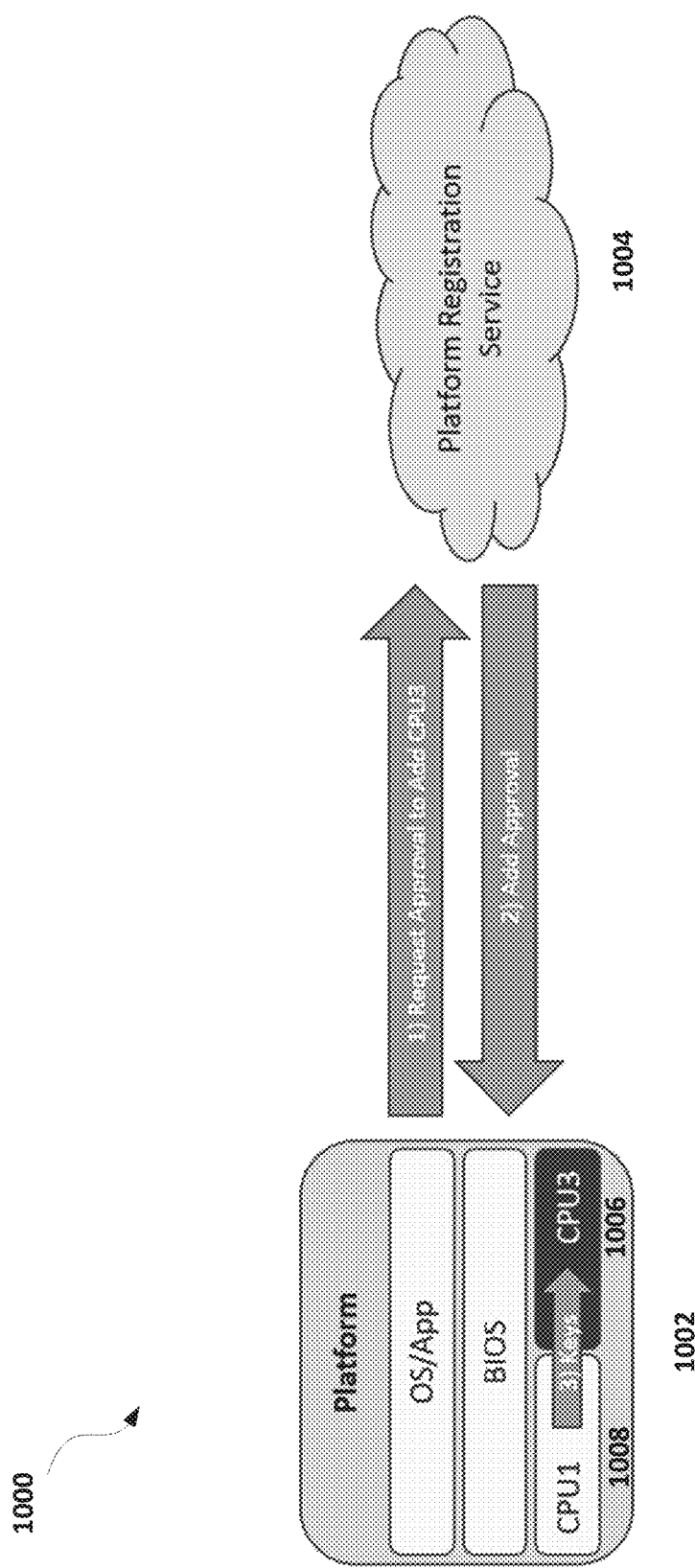
FIG. 10 is a schematic block diagram for replacing a package on an established platform in accordance with embodiments of the present disclosure.

FIG. 10 is a schematic block diagram for replacing a package on an established platform in accordance with embodiments of the present disclosure. To help ensure that evaluations of platforms and constituent packages remain accurate, platform keys cannot be exposed to unauthorized packages. When adding or replacing a package to an established platform (i.e., a platform that has undergone attestation and registration, as described herein), the platform 1002 can send a request to the registration service 1002 requesting that a new package (here, CPU3) 1006 be added to the platform. The request can be sent as an update to a manifest that includes an additional package as well as the packages device/package key (as described above).

The registration service 1004 can use the package certificate stored in a database to verify the authenticity of the new package 1006. The registration service 1004 can approve of the package 1006 and send an approval message back to the platform. The previously approved package (e.g., package 1008) can share current keys with the new package 1006.

In some embodiments, to add a new package, the platform can discard existing keys, and create new manifests for all existing and new packages (as described above).

Figure 11:
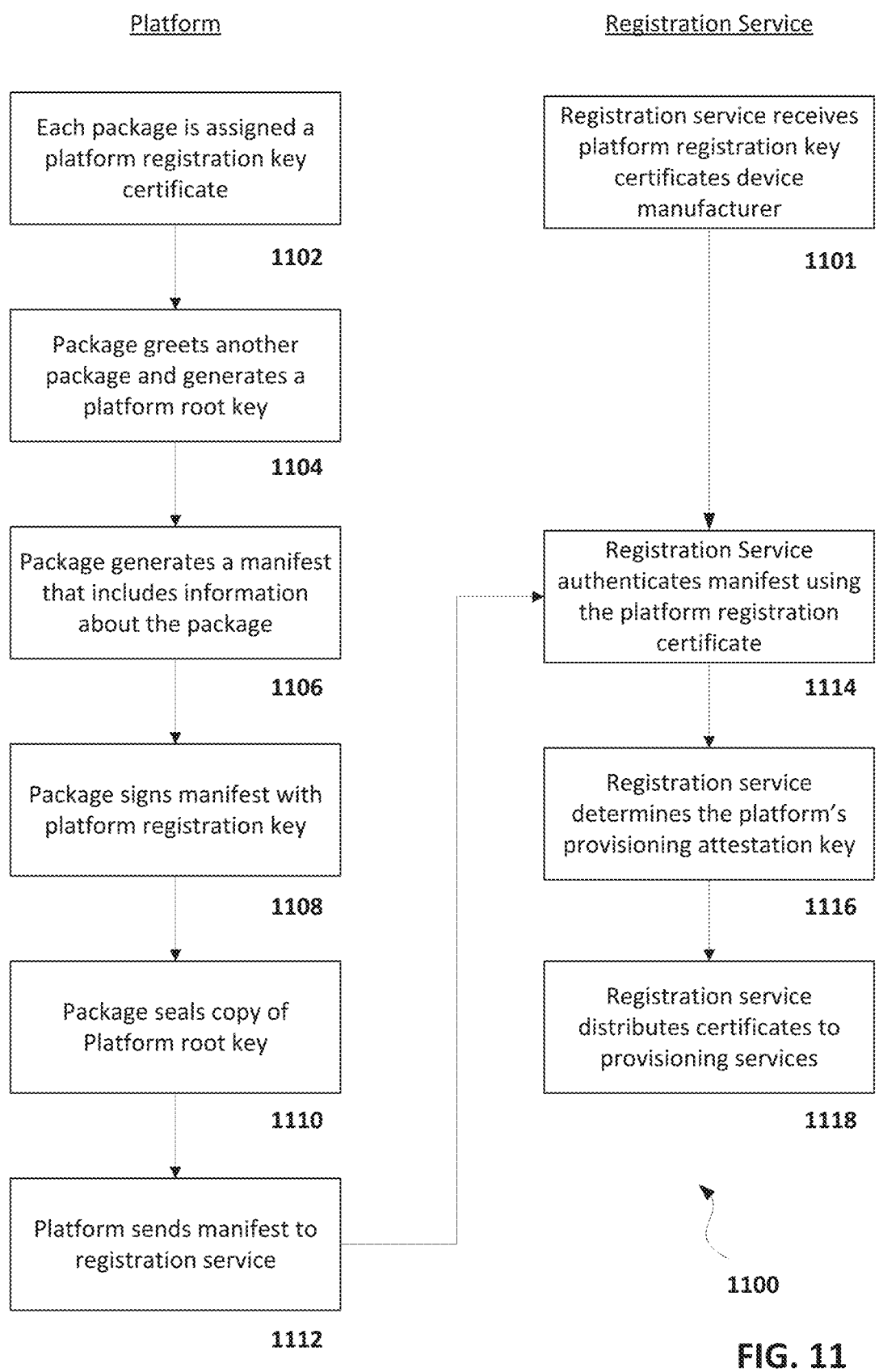
FIG. 11 is a process flow diagram for forming a platform manifest in accordance with embodiments of the present disclosure.

FIG. 11 is a process flow diagram 1100 for authenticating a platform in accordance with embodiments of the present disclosure. As an initialization step, a manufacturer of a package can send a package certificate to registration services, which can store the package certificates in a database (1101). Each package includes (or is assigned) a corresponding platform registration key certificate (1102).

Each package in the platform can greet each other to generate a platform root key (1104). Each package of the platform can generate a manifest that includes information about the package, including a platform root key and device key, as well as information about other packages in the platform (1006). The package can sign the manifest with a platform registration key (1108). In some embodiments, the package can also seal a copy of the platform root key (1110). The platform sends the manifest to the registration service (1112).

The registration service receives the manifest and can authenticate the manifest using the platform registration certificate(s) for each package in the manifest (1114). The registration service can determine the platform's provisioning attestation key certificates (1116). The registration service can distribute the provisioning attestation key certificates to a provisioning service (1118).

FIGS. 12-15 are block diagrams of exemplary computer architectures that may be used in accordance with embodiments disclosed herein. Other computer architecture designs known in the art for processors, mobile devices, and computing systems may also be used. Generally, suitable computer architectures for embodiments disclosed herein can include, but are not limited to, configurations illustrated in FIGS. 12-15.

Figure 12:
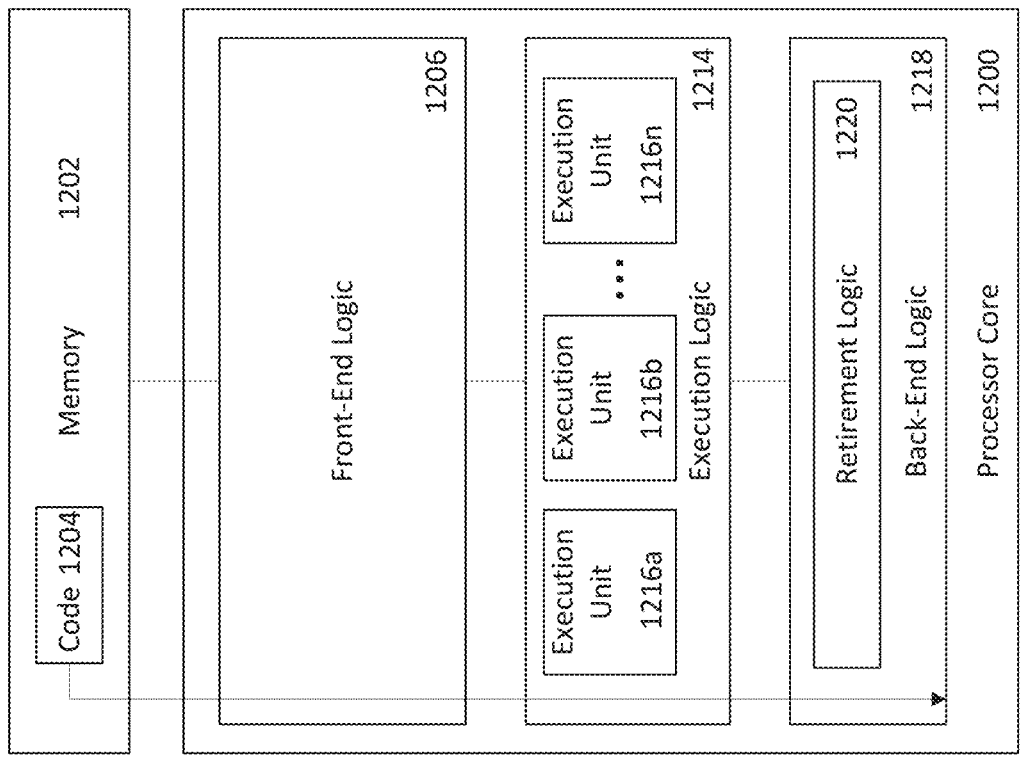
FIG. 12 is an example illustration of a processor according to an embodiment.

FIG. 12 is an example illustration of a processor according to an embodiment.

Processor 1200 is an example of a type of hardware device that can be used in connection with the implementations above.

Processor 1200 may be any type of processor, such as a microprocessor, an embedded processor, a digital signal processor (DSP), a network processor, a multi-core processor, a single core processor, or other device to execute code. Although only one processor 1200 is illustrated in FIG. 12, a processing element may alternatively include more than one of processor 1200 illustrated in FIG. 12. Processor 1200 may be a single-threaded core or, for at least one embodiment, the processor 1200 may be multi-threaded in that it may include more than one hardware thread context (or "logical processor") per core.

FIG. 12 also illustrates a memory 1202 coupled to processor 1200 in accordance with an embodiment. Memory 1202 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 1200 can execute any type of instructions associated with algorithms, processes, or operations detailed herein. Generally, processor 1200 can transform an element or an article (e.g., data) from one state or thing to another state or thing.

Code 1204, which may be one or more instructions to be executed by processor 1200, may be stored in memory 1202, or may be stored in software, hardware, firmware, or any suitable combination thereof, or in any other internal or external component, device, element, or object where appropriate and based on particular needs. In one example, processor 1200 can follow a program sequence of instructions indicated by code 1204. Each instruction enters a front-end logic 1206 and is processed by one or more decoders 1208. The decoder may generate, as its output, a micro operation such as a fixed width micro operation in a predefined format, or may generate other instructions, microinstructions, or control signals that reflect the original code instruction. Front-end logic 1206 also includes register renaming logic 1210 and scheduling logic 1212, which generally allocate resources and queue the operation corresponding to the instruction for execution.

Processor 1200 can also include execution logic 1214 having a set of execution units 1216a, 1216b, 1216n, etc. Some embodiments may include a number of execution units dedicated to specific functions or sets of functions. Other embodiments may include only one execution unit or one execution unit that can perform a particular function. Execution logic 1214 performs the operations specified by code instructions.

After completion of execution of the operations specified by the code instructions, back-end logic 1218 can retire the instructions of code 1204. In one embodiment, processor 1200 allows out of order execution but requires in order retirement of instructions. Retirement logic 1220 may take a variety of known forms (e.g., re-order buffers or the like). In this manner, processor 1200 is transformed during execution of code 1204, at least in terms of the output generated by the decoder, hardware registers and tables utilized by register renaming logic 1210, and any registers (not shown) modified by execution logic 1214.

Although not shown in FIG. 12, a processing element may include other elements on a chip with processor 1200. For example, a processing element may include memory control logic along with processor 1200. The processing element may include I/O control logic and/or may include I/O control logic integrated with memory control logic. The processing element may also include one or more caches. In some embodiments, non-volatile memory (such as flash memory or fuses) may also be included on the chip with processor 1200.

Figure 13:
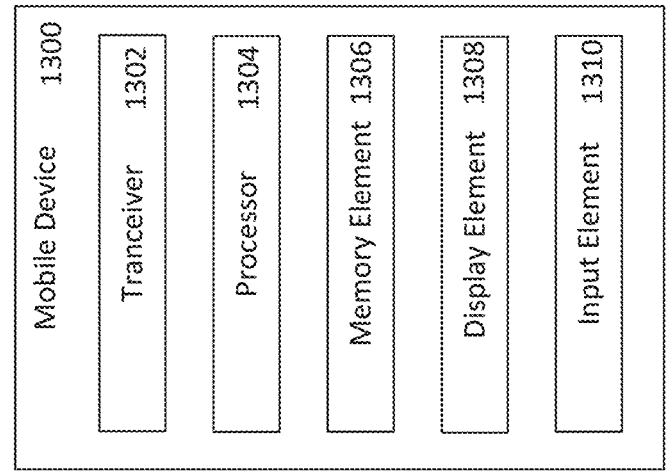
FIG. 13 is a block diagram of an example mobile device.

Referring now to FIG. 13, a block diagram is illustrated of an example mobile device 1300. Mobile device 1300 is an example of a possible computing system (e.g., a host or endpoint device) of the examples and implementations described herein. In an embodiment, mobile device 1300 operates as a transmitter and a receiver of wireless communications signals. Specifically, in one example, mobile device 1300 may be capable of both transmitting and receiving cellular network voice and data mobile services. Mobile services include such functionality as full Internet access, downloadable and streaming video content, as well as voice telephone communications.

Mobile device 1300 may correspond to a conventional wireless or cellular portable telephone, such as a handset that is capable of receiving "3G", or "third generation" cellular services. In another example, mobile device 1300 may be capable of transmitting and receiving "4G" mobile services as well, or any other mobile service.

Examples of devices that can correspond to mobile device 1300 include cellular telephone handsets and smartphones, such as those capable of Internet access, email, and instant messaging communications, and portable video receiving and display devices, along with the capability of supporting telephone services. It is contemplated that those skilled in the art having reference to this specification will readily comprehend the nature of modern smartphones and telephone handset devices and systems suitable for implementation of the different aspects of this disclosure as described herein. As such, the architecture of mobile device 1300 illustrated in FIG. 13 is presented at a relatively high level. Nevertheless, it is contemplated that modifications and alternatives to this architecture may be made and will be apparent to the reader, such modifications and alternatives contemplated to be within the scope of this description.

In an aspect of this disclosure, mobile device 1300 includes a transceiver 1302, which is connected to and in communication with an antenna. Transceiver 1302 may be a radio frequency transceiver. Also, wireless signals may be transmitted and received via transceiver 1302. Transceiver 1302 may be constructed, for example, to include analog and digital radio frequency (RF) 'front end' functionality, circuitry for converting RF signals to a baseband frequency, via an intermediate frequency (IF) if desired, analog and digital filtering, and other conventional circuitry useful for carrying out wireless communications over modern cellular frequencies, for example, those suited for 3G or 4G communications. Transceiver 1302 is connected to a processor 1304, which may perform the bulk of the digital signal processing of signals to be communicated and signals received, at the baseband frequency. Processor 1304 can provide a graphics interface to a display element 1308, for the display of text, graphics, and video to a user, as well as an input element 1310 for accepting inputs from users, such as a touchpad, keypad, roller mouse, and other examples. Processor 1304 may include an embodiment such as shown and described with reference to processor 1200 of FIG. 12.

In an aspect of this disclosure, processor 1304 may be a processor that can execute any type of instructions to achieve the functionality and operations as detailed herein. Processor 1304 may also be coupled to a memory element 1306 for storing information and data used in operations performed using the processor 1304. Additional details of an example processor 1304 and memory element 1306 are subsequently described herein. In an example embodiment, mobile device 1300 may be designed with a system-on-a-chip (SoC) architecture, which integrates many or all components of the mobile device into a single chip, in at least some embodiments.

Figure 14:
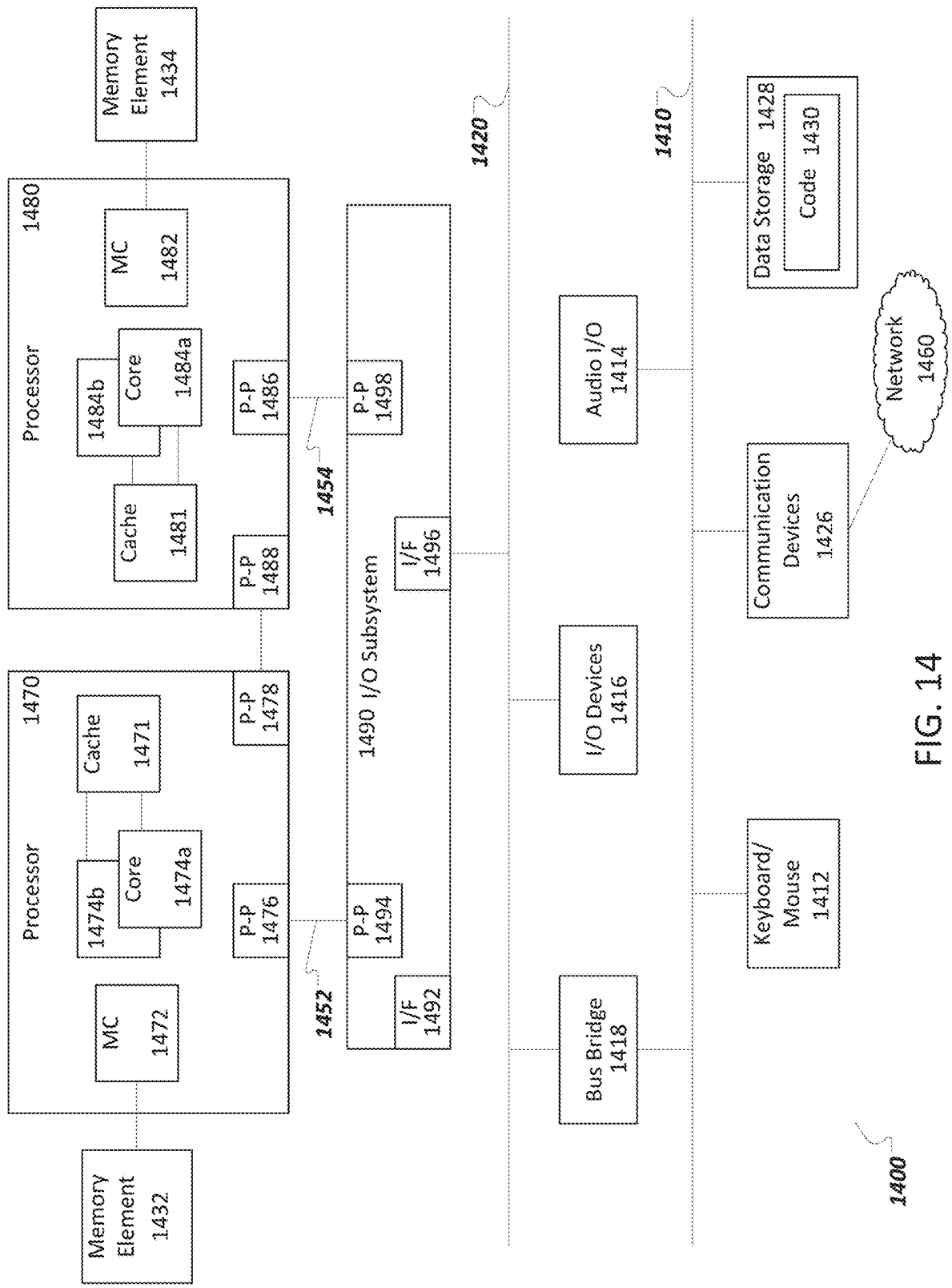
FIG. 14 illustrates a computing system that is arranged in a point-to-point (PtP) configuration according to an embodiment.

FIG. 14 illustrates a computing system 1400 that is arranged in a point-to-point (PtP) configuration according to an embodiment. In particular, FIG. 14 shows a system where processors, memory, and input/output devices are interconnected by a number of point-to-point interfaces. Generally, one or more of the computing systems described herein may be configured in the same or similar manner as computing system 1400.

Processors 1470 and 1480 may also each include integrated memory controller logic (MC) 1472 and 1482 to communicate with memory elements 1432 and 1434. In alternative embodiments, memory controller logic 1472 and 1482 may be discrete logic separate from processors 1470 and 1480. Memory elements 1432 and/or 1434 may store various data to be used by processors 1470 and 1480 in achieving operations and functionality outlined herein.

Processors 1470 and 1480 may be any type of processor, such as those discussed in connection with other figures. Processors 1470 and 1480 may exchange data via a point-to-point (PtP) interface 1450 using point-to-point interface circuits 1478 and 1488, respectively. Processors 1470 and 1480 may each exchange data with a chipset 1490 via individual point-to-point interfaces 1452 and 1454 using point-to-point interface circuits 1476, 1486, 1494, and 1498. Chipset 1490 may also exchange data with a high-performance graphics circuit 1438 via a high-performance graphics interface 1439, using an interface circuit 1492, which could be a PtP interface circuit. In alternative embodiments, any or all of the PtP links illustrated in FIG. 14 could be implemented as a multi-drop bus rather than a PtP link.

Chipset 1490 may be in communication with a bus 1420 via an interface circuit 1496. Bus 1420 may have one or more devices that communicate over it, such as a bus bridge 1418 and I/O devices 1416. Via a bus 1410, bus bridge 1418 may be in communication with other devices such as a keyboard/mouse 1412 (or other input devices such as a touch screen, trackball, etc.), communication devices 1426 (such as modems, network interface devices, or other types of communication devices that may communicate through a computer network 1460), audio I/O devices 1414, and/or a data storage device 1428. Data storage device 1428 may store code 1430, which may be executed by processors 1470 and/or 1480. In alternative embodiments, any portions of the bus architectures could be implemented with one or more PtP links.

The computer system depicted in FIG. 14 is a schematic illustration of an embodiment of a computing system that may be utilized to implement various embodiments discussed herein. It will be appreciated that various components of the system depicted in FIG. 14 may be combined in a system-on-a-chip (SoC) architecture or in any other suitable configuration capable of achieving the functionality and features of examples and implementations provided herein.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification. One or more embodiments may provide an apparatus, a system, a machine readable storage, a machine readable medium, hardware- and/or software-based logic, and a method to register a new package within a platform with a registration service.

Example 1 may include generating a platform root key; creating a data structure to encapsulate the platform root key, the data structure comprising a platform provisioning key and an identification of a registration service; and transmitting, on a secure connection, the data structure to the registration service to register the platform root key for the first processor of the platform.

Example 2 may include the subject matter of example 1, and also include encrypting a copy of the data structure using a device key for the first processor.

Example 3 may include the subject matter of any of examples 1 or 2, and also include deriving a platform seal key and store a platform provisioning key root to derive a platform provisioning key.

Example 4 may include the subject matter of any of examples 1 or 2 or 3, wherein the data structure comprising information about a second processor of the platform.

Example 5 may include the subject matter of example 3, wherein the information about the second processor comprises a platform provisioning key root to derive a platform provisioning key.

Example 6 may include the subject matter of any of examples 1 or 2 or 3 or 4, and also include identifying a unique identifier from a new processor for the platform; transmitting, to the registration service, a request to add the new processor to the platform, the request comprising a unique identifier for the platform and the unique identifier for the new processor; receiving approval to add the new processor the platform; and providing, to the new processor, one or more platform root keys for the platform.

Example 7 is at least one computer readable storage medium having instructions stored thereon, the instructions when executed on a machine, cause the machine to for a first processor of a platform, generate a platform root key; create a data structure to encapsulate the platform root key, the data structure comprising a platform provisioning key and an identification of a registration service; and transmit, on a secure connection, the data structure to the registration service to register the platform root key for the first processor of the platform.

Example 8 may include the subject matter of example 7, wherein the instructions when executed on the machine, cause the machine to encrypt a copy of the data structure using a platform registration key for the first processor.

Example 9 may include the subject matter of any of examples 7 or 8, wherein the instructions when executed on the machine, cause the machine to store a platform seal key root to derive a platform seal key and store a platform provisioning key root to derive a platform provisioning key.

Example 10 may include the subject matter of any of examples 7 or 8 or 9, wherein the data structure comprising information about a second processor of the platform.

Example 11 may include the subject matter of any of examples 7 or 8 or 9 or 10, wherein the information about the second processor comprises a platform provisioning key root to derive a platform provisioning key.

Example 12 is at least one computer readable storage medium having instructions stored thereon, the instructions when executed on a machine, cause the machine to store a device certificate received from a key generation facility; receive a manifest from a platform, the manifest comprising an identification of a processor associated with the platform; and validate the processor using a stored device certificate.

Example 13 may include the subject matter of example 12, wherein the instructions when executed on the machine, cause the machine to authenticate the manifest using a platform registration certificate associated with the processor identified in the manifest.

Example 14 may include the subject matter of any of examples 12 or 13, wherein the instructions when executed on the machine, cause the machine to derive a provisioning attestation certificate for the platform.

Example 15 may include the subject matter of any of examples 12 or 13 or 14, wherein the instructions when executed on the machine, cause the machine to distribute the provisioning attestation certificate to a provisioning service.

Example 16 may include the subject matter of any of examples 12 or 13 or 14 or 15, wherein the instructions when executed on the machine, cause the machine to receive a request to add a new processor to a platform, the request comprising a unique platform identifier and a unique identifier for the new processor; authenticate the new processor using a platform registration certificate for the new processor; and transmitting to an existing processor in the platform an approval message that includes a platform registration key for the new processor.

Example 17 is a method that includes storing a device certificate received from a key generation facility; receiving a manifest from a platform, the manifest comprising an identification of a processor associated with the platform; and validating the processor using a stored device certificate.

Example 18 may include the subject matter of example 17, and also include authenticating the manifest using a platform registration certificate associated with the processor identified in the manifest.

Example 19 may include the subject matter of any of examples 17 or 18, and may also include determining a provisioning attestation certificate for the platform.

Example 20 may include the subject matter of any of examples 17 or 18 or 19, and may also include distributing the provisioning attestation certificate to a provisioning service.

Example 21 may include the subject matter of any of examples 17 or 18 or 19 or 20, and may also include receiving a request to add a new processor to a platform, the request comprising a unique platform identifier and a unique identifier for the new processor; authenticating the new processor using a platform registration certificate for the new processor; and transmitting to an existing processor in the platform an approval message that includes a platform registration key for the new processor.

Example 22 is an apparatus that may include means for generating a platform root key; creating a data structure to encapsulate the platform root key, the data structure comprising a platform provisioning key and an identification of a registration service; and transmitting, on a secure connection, the data structure to the registration service to register the platform root key for the first processor of the platform.

Example 23 may include the subject matter of example 22, and also include means for encrypting a copy of the data structure using a device key for the first processor.

Example 24 may include the subject matter of any of examples 22 or 23, and also include means for deriving a platform seal key and store a platform provisioning key root to derive a platform provisioning key.

Example 25 may include the subject matter of any of examples 22 or 23 or 24, wherein the data structure includes information about a second processor of the platform.

Example 26 may include the subject matter of example 25, wherein the information about the second processor comprises a platform provisioning key root to derive a platform provisioning key.

Example 27 may include the subject matter of any of examples 22 or 23 or 24 or 25, and also include means for identifying a unique identifier from a new processor for the platform; transmitting, to the registration service, a request to add the new processor to the platform, the request comprising a unique identifier for the platform and the unique identifier for the new processor; receiving approval to add the new processor the platform; and providing, to the new processor, one or more platform root keys for the platform.

Example 28 is an apparatus that includes means for storing a device certificate received from a key generation facility; receiving a manifest from a platform, the manifest comprising an identification of a processor associated with the platform; and validating the processor using a stored device certificate.

Example 29 may include the subject matter of example 28, and also include means for authenticating the manifest using a platform registration certificate associated with the processor identified in the manifest.

Example 30 may include the subject matter of any of examples 28 or 29, and may also include means for determining a provisioning attestation certificate for the platform.

Example 31 may include the subject matter of any of examples 28 or 29 or 30, and may also include means for distributing the provisioning attestation certificate to a provisioning service.

Example 32 may include the subject matter of any of examples 28 or 29 or 30 or 31, and may also include means for receiving a request to add a new processor to a platform, the request comprising a unique platform identifier and a unique identifier for the new processor; authenticating the new processor using a platform registration certificate for the new processor; and transmitting to an existing processor in the platform an approval message that includes a platform registration key for the new processor.

Example 33 is a system that includes at least one processor, at least one memory element, and a registration service module. The registration service module is executable by the at least one processor to store a device certificate received from a key generation facility, receive a manifest from a platform, the manifest comprising an identification of a processor associated with the platform; and validate the processor using a stored device certificate.

Example 34 may include the subject matter of example 33, wherein the registration service module is executable by the at least one processor to authenticate the manifest using the device certificate associated with the processor identified in the manifest.

Example 35 may include the subject matter of any of examples 33 or 34, wherein the registration service module is executable by the at least one processor to issue a provisioning attestation certificate for the platform.

Example 36 may include the subject matter of any of examples 33 or 34 or 35, wherein the registration service module is executable by the at least one processor to distribute the provisioning attestation certificate to a provisioning service.

Example 37 may include the subject matter of any of examples 33 or 34 or 35 or 36, wherein the registration service module is executable by the at least one processor to receive a request to add a new processor to a platform, the request comprising a unique platform identifier and a unique identifier for the new processor, authenticate the new processor using a platform registration certificate for the new processor, and transmit to an existing processor in the platform an approval message that includes a platform registration key for the new processor.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A non-transitory computer readable storage medium comprising instructions which, when executed, cause one or more processors to at least:
   obtain signed data from a first remote device via a front end service, the signed data based on a cryptographic key of the first remote device;
   confirm software of the first remote device is authentic based on the signed data;
   generate a credential to enable communication between the first remote device and a second remote device; and
   cause the front end service to transmit the credential to the first remote device.

2. The non-transitory computer readable storage medium of claim 1, wherein the signed data is based on hardware of the first remote device.

3. The non-transitory computer readable storage medium of claim 1, wherein the cryptographic key generated in and protected by the first remote device.

4. The non-transitory computer readable storage medium of claim 1, wherein the software of the first remote device is authentic when the software is trustworthy.

5. The non-transitory computer readable storage medium of claim 1, wherein the first remote device uses the credential to connect to the second remote device.

6. The non-transitory computer readable storage medium of claim 1, wherein the instructions cause the one or more processors to cause the front end service to transmit the credential to the second remote device.

7. The non-transitory computer readable storage medium of claim 1, wherein the signed data attests to an authenticity of the software of the first remote device.

8. An apparatus comprising:
   memory:
   instructions included in the apparatus; and
   processor circuitry to execute the instructions to:
      obtain signed data from a first remote device via a front end service, the signed data signed using a cryptographic key of the first remote device;
      confirm software of the first remote device is authentic based on the signed data;
      generate a credential to enable communication between the first remote device and a second remote device; and
      cause the front end service to transmit the credential to the first remote device.

9. The apparatus of claim 8, wherein the signed data is based on hardware of the first remote device.

10. The apparatus of claim 8, wherein the signed data is based on a root key of the first remote device.

11. The apparatus of claim 8, wherein the software of the first remote device is authentic when the software is trustworthy.

12. The apparatus of claim 8, wherein the first remote device uses the credential to connect to the second remote device.

13. The apparatus of claim 8, wherein the processor circuitry is to cause the front end service to transmit the credential to the second remote device.

14. The apparatus of claim 8, wherein the signed data attests to an authenticity of the software of the first remote device.

15. A system comprising:
   a processing device to:
      sign data using a cryptographic key of the processing device to attest to software running on the processing device; and transmit the signed data to a first server; and
   the first server to:
      obtain the signed data from the processing device;
      confirm the software of the processing device is authentic based on the signed data;
      generate a credential to enable communication between the processing device and a second server; and
      transmit the credential to the processing device; and the processing device to access services of the second server using the credential from the first server.

16. The system of claim 15, wherein the processing device is to measure a trustworthiness of the software running locally on a device platform the processing device.

17. The system of claim 15, wherein the cryptographic key is generated in the processing device.

18. The system of claim 15, wherein the processing device is to access the services of the second server by transmitting the credential to the second server.

19. The system of claim 15, wherein the first server is to transmit the credential to the second server.

20. The system of claim 15, wherein the second server provides the services to the second server in response to confirming that credential.

* * * * *